United States Patent [19]

Krummenacher

[11] Patent Number: 5,505,613
[45] Date of Patent: Apr. 9, 1996

[54] INJECTION MOLDING NOZZLE HAVING A CENTERING BUSHING

[75] Inventor: Josef Krummenacher, Muri, Switzerland

[73] Assignee: Apparate-und Werkzeugbau AG, Muri, Switzerland

[21] Appl. No.: 288,815

[22] Filed: Aug. 11, 1994

[30] Foreign Application Priority Data

Aug. 13, 1993 [CH] Switzerland ............. 02406/93

[51] Int. Cl.$^6$ ............................................. B29C 45/23
[52] U.S. Cl. ............. 425/562; 264/328.9; 425/564; 425/566
[58] Field of Search .................. 425/549, 562, 425/564, 566; 264/328.9

[56] References Cited

U.S. PATENT DOCUMENTS

| | | | |
|---|---|---|---|
| 4,312,630 | 1/1982 | Travaglini | 425/568 |
| 4,652,230 | 3/1987 | Osuna-Diaz | 425/549 |
| 5,098,280 | 3/1992 | Trakas | 425/549 |
| 5,183,209 | 2/1993 | Ricco et al. | 239/585.1 |

FOREIGN PATENT DOCUMENTS

| | | | |
|---|---|---|---|
| 2537497 | 6/1984 | France . | |
| 1124234 | 2/1962 | Germany . | |
| 5-177664 | 7/1993 | Japan | 425/562 |

*Primary Examiner*—Tim Heitbrink
*Attorney, Agent, or Firm*—Marks & Murase

[57] ABSTRACT

The injection nozzle has a thin-walled centering bushing inserted between the tip insert and the mold insert. The centering bushing engages a shoulder of the mold insert and thus achieves a mutual centering and sealing of the tip insert and the mold insert. This avoids the inflow of molding material into the cavity between the tip insert and the mold insert which would impair or delay the changing of colors of the material, and the injection needle is effectively centered so that a cylindrical tip portion can close a very short cylindrical portion of a gate bore. The heat transfer between the heated nozzle parts and the mold insert is nevertheless maintained at a low level since the mutual centering is obtained by narrow contact sites.

13 Claims, 2 Drawing Sheets

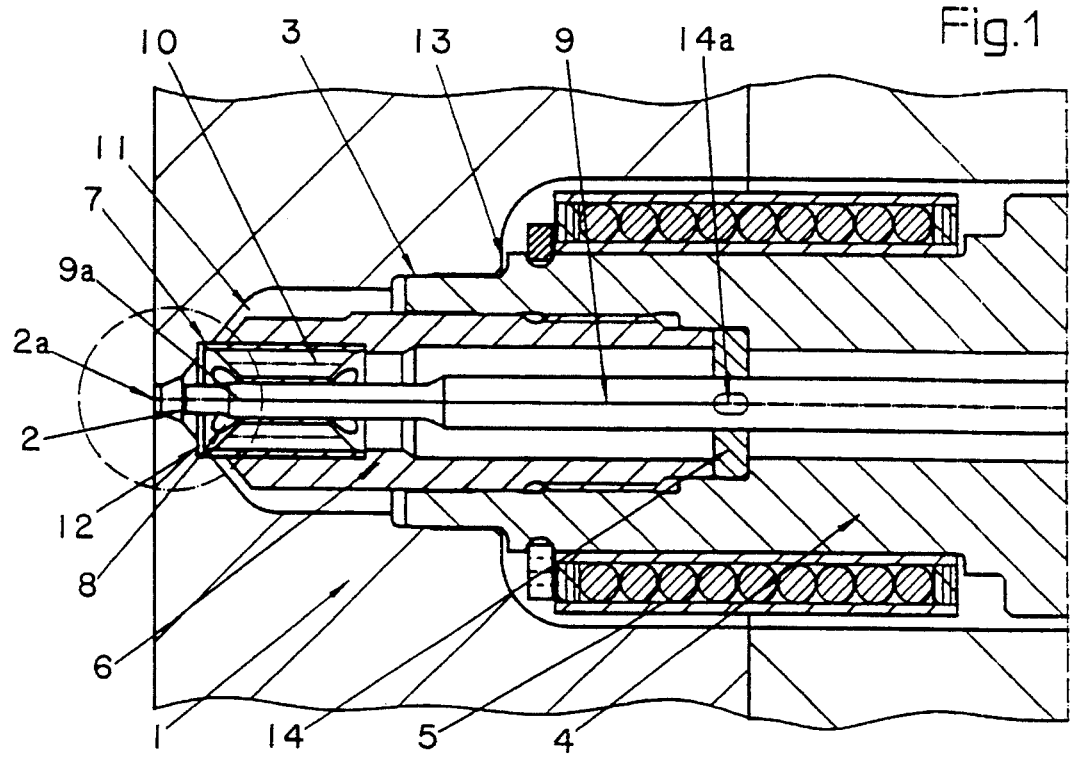
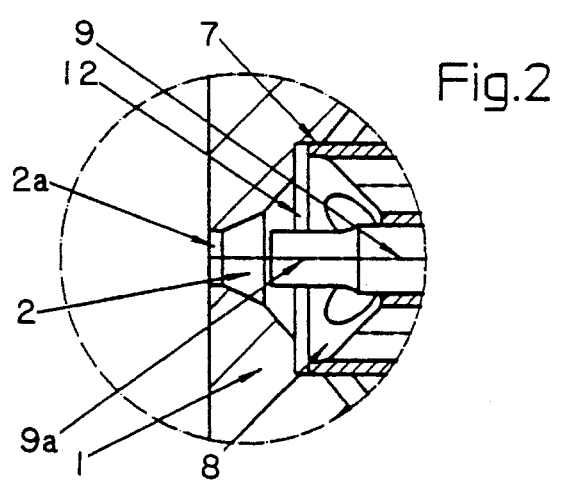

INJECTION MOLDING NOZZLE HAVING A CENTERING BUSHING

BACKGROUND OF THE INVENTION

This invention concerns an injection molding nozzle for an injection mold and more particularly a heatable injection molding nozzle comprising a tip insert, a mold insert, and a displaceable needle having a cylindrical needle tip fitting with small clearance into a cylindrical end portion of a gating of the mold.

In a known injection molding nozzle of this kind disclosed in published French Patent Application No. FR-A-2,537,497, a conical tip insert freely protrudes into the mold insert of the nozzle without being in contact with the insert. This approach has been selected in order to keep the heat transfer low between the mold insert and the tip insert at the location of the outlet of the molding material. However, this solution has the disadvantage that a hollow space remains in the outlet conduit between the tip insert and the mold insert where the material to be molded during molding can enter and will remain therein. This remaining material impairs or slows down a rapid change of the molding material, especially a color change. In spite of this disadvantage, a relatively intensive heat transfer between the tip insert and the mold insert cannot be avoided. The centering of the nozzle needle in the mold gating is deficient since the cylindrical needle tip is not precisely guided with respect to the cylindrical end region of the gate opening so that gripping of the tip will occur.

It is an object of the present invention to avoid the drawbacks discussed above and to obtain additional advantages.

SUMMARY OF THE INVENTION

This and other objects of the present invention which will become apparent from the following description and claims, are achieved by providing an injection nozzle wherein a centering bushing is sealingly inserted for centering between the tip insert and the mold insert; the bushing comprises a central bore for the guidance of the nozzle needle and furthermore passages for the molding material in such a manner that the needle is guided immediately behind its end relative to the mold insert.

The centering bushing brings first about a seal between the tip insert and the mold insert, in such a manner that no molding material can enter into the hollow space between these two parts. This makes possible a color change of the molding material which can be achieved substantially more rapid and without any problem. The heat transfer between the tip insert and the mold insert can nevertheless be kept at a low level when the centering bushing is made to have thin walls and projects only by a short distance into the mold insert, which distance is however sufficient to ascertain the mutual centering and sealing of these parts. This short distance is preferably substantially smaller than the diameter of the centering bushing.

Due to this mutual centering immediately in front of the discharge opening, the remaining other mutual contact surface areas between the mold insert and heated part or regions of the nozzle can be kept particularly small, and a very precise centering of the needle with respect to the gate opening is obtained.

Further particularities and advantages of the nozzle of the present invention will become apparent from the description of an embodiment thereof and from two variants of the nozzle which are shown in the drawings.

BRIEF DESCRIPTION OF THE DRAWINGS

FIG. 1 is an axially sectional view of the nozzle according to the first embodiment.

FIG. 2 is an enlarged detail of FIG. 1.

DETAILED DESCRIPTION OF THE INVENTION

Figure 3:
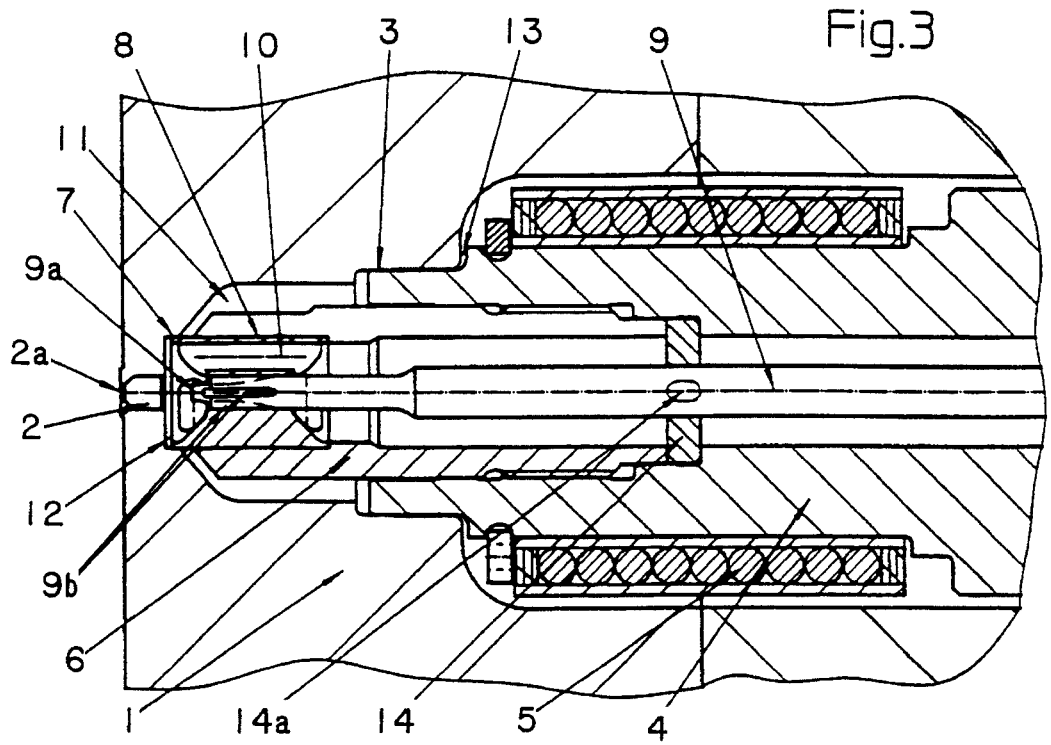
FIGS. 3 and 4 are axially sectional views of variants of the first embodiment.

The mold according to FIGS. 1 and 2 comprises a mold insert 1 of hardened steel having a gate opening 2. This mold insert 1 sits with a narrow centering surface 3 on the nozzle body 4 which can be heated by a heating coil cartridge 5. The tip insert 6 is screwed into the front end region of the nozzle body 4. A thin-walled centering bushing 8 of hardened steel is inserted between the tip insert 6 and a shoulder 7 of the mold insert. A central bore of this centering bushing 8 serves for guiding of the front end portion of the needle 9, and a ring of bores 10 in the centering bushing 8 serves for the flow of molding material towards the opening 2. The centering bushing 8 contacts the mold insert over a minimal depth only which is just sufficient to ascertain a mutual centering of the centering bushing 8 or the tip insert 6, respectively, and the mold insert as well as the mutual sealing of the annular chamber 11 situated between these two parts. Due to this additional centering immediately adjacent the outflow opening, the centering surface 3 can be kept small too, and there is only a minimal heat transfer between the mold insert and the heated parts with which it is in contact. On both sides of the centering surface 3, the mold insert always has a distance to the heated parts so that the heat transfer is small again. A dilatation joint 12 remains between the centering bushing 8 and the shoulder 7, this joint allowing a certain mutual axial displacement between the parts 1 and 8 due to the different temperatures on heating and to the different materials. A corresponding dilatation joint 13 is provided between the nozzle body 4 and the mold insert 1. The needle 9 is guided between radial ribs 14a of a guiding ring 14 which comprises openings between the ribs for the flow of the molding material. The guidance and the centering of the needle 9 immediately in front of the gate opening 2 allows a precise and nearly clearance free entering of a cylindrical tip 9a of the needle 9 into the cylindrical portion 2a of the gate opening 2 and thus a proper closure of the mold or a neat gate mark on the molded article, respectively. Thanks to the mutual centering of the needle 9 and the mold insert 1 immediately in front of the gate opening 2, 2a, the cylindrical portion 2a of the gate opening may be made very short, for example only about 0.2 mm, so that only very few material must be pressed in on the closing by the needle.

The centering bushing 8 having annularly arranged through bores 10 additionally acts as a filter which captures any foreign bodies and thus protects the gate opening and the needle from damages.

In the shown embodiment, the bushing 8 is inserted as a special part made of hardened steel into the tip insert which is made, in this case, of a beryllium copper alloy. It would also be possible to make the tip insert 6 and the centering bushing 8 in one piece of the same material.

Figure 4:
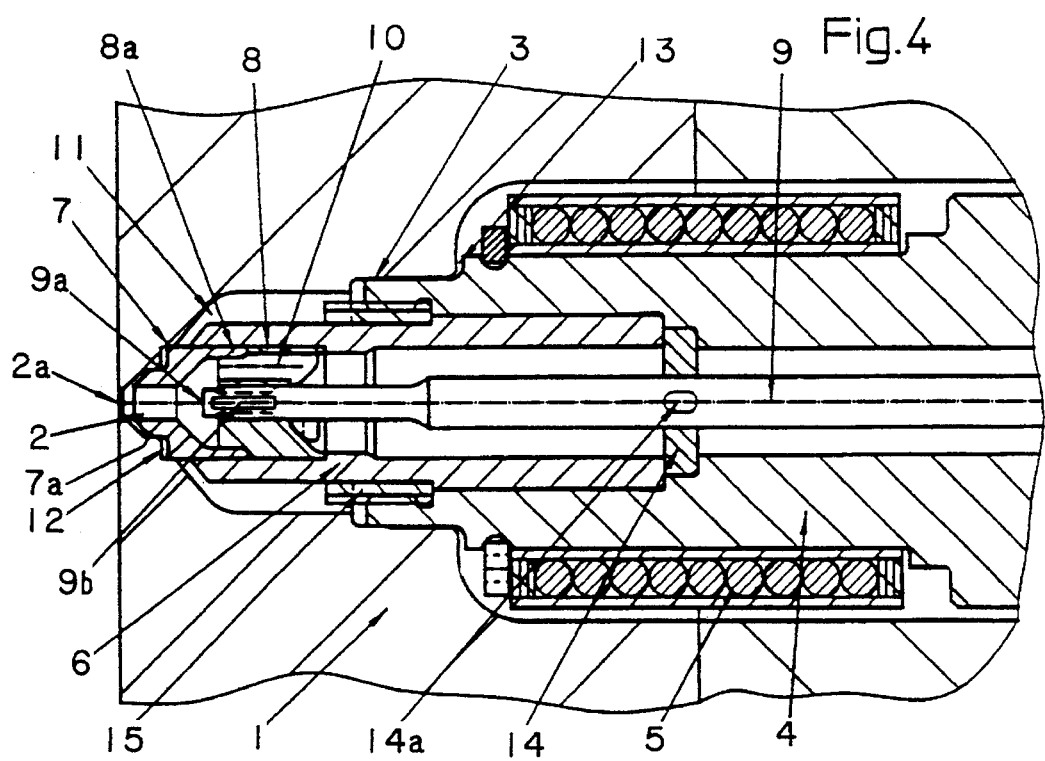

In FIGS. 3 and 4, corresponding parts bear the same reference numerals as in FIGS. 1 and 2 even if details may be different. According to FIG. 3, the gate opening in mold insert 1 comprises a further cylindrical portion 2 in front of the axially very short portion 2a, said portion 2 serving for an additional guidance for the cylindrical portion 9 of the needle which follows the tip 9a. This brings about a still more effective guidance and centering of the needle. Grooves 9b are milled into the section of the needle 9 which penetrates into the wider guiding portion of the gate opening 2 during closing through which the molding material can flow back from the wider space of the gate opening when the needle penetrates into this space.

In the embodiment of FIG. 4 too, the needle is additionally guided immediately behind the short, cylindrical portion 2a of the gate opening in an enlarged, cylindrical portion 2; in the present embodiment, the guiding portion 2 is not disposed in the mold insert 1 but in a front portion 8a of a two-piece centering bushing 8, 8a. This front portion 8a of the centering bushing is additionally centered at an additional shoulder 7a of the mold insert 1. A further difference with respect to the other embodiments is that the tip insert 6 is not screwed to the nozzle body but trimmed in and secured by means of a ring nut 15. The fitting in of the tip insert 6 in the bore of the nozzle body is selected such that a snug fitting is obtained after heating during operation, the nozzle body 4 being of steel and the tip insert of beryllium copper. Thus, a still more precise mutual positioning of the parts is obtained in that inaccuracies due to a direct screwing of the tip insert into the nozzle body are avoided.

It should be appreciated that many variations and modifications are of course possible within the scope of the appended claims.

I claim:

1. An injection molding nozzle for an injection mold, comprising:

a tip insert, a mold insert, a nozzle body connected to said tip insert, and a displaceable needle located in said nozzle body and said tip insert, said displaceable needle having a cylindrical needle tip fitting with a small clearance into a cylindrical end portion of a gate opening of the mold insert, said nozzle further comprising a centering bushing sealingly inserted between the tip insert and a shoulder of the mold insert, said centering bushing comprising a central bore for guiding the needle and further comprising openings for an injection molding material, so that the needle is reciprocally guided relative to the mold insert; and further comprising a cylindrical guideway adjacent said gate opening, said needle comprising a cylindrical guiding portion for guiding said needle in said cylindrical guideway, the cylindrical guiding portion of the needle being provided with grooves for the backflow of the injection molding material.

2. An injection molding nozzle for an injection mold, comprising:

a tip insert;
   a mold insert;
   a displaceable needle having a cylindrical needle tip fitting with small clearance into a cylindrical end portion of a gate opening of said mold insert;
   a centering brushing being inserted between said tip insert and a shoulder of said mold insert, said centering bushing comprising a central bore for guiding said needle immediately behind said cylindrical needle tip and openings for permitting injection molding material to flow from said tip insert to said gate opening; and
   a nozzle body bearing said tip insert and protruding into said mold insert, wherein said nozzle body fits to said mold insert by an annular centering surface which is substantially smaller than a length of said nozzle body, and said nozzle body otherwise being spaced from said mold insert.

3. The injection nozzle according to claim 2, wherein said centering bushing is inserted between said tip insert and shoulder of said mold insert with axial play.

4. The injection nozzle according to claim 2, wherein said centering bushing contacts said mold insert over a minimal depth which is just sufficient for centering said centering bushing within the mold insert and sealing the gate opening of said mold insert, and further comprising a chamber situated between said mold insert, and further comprising a chamber situated between said mold insert and said tip insert.

5. The injection nozzle according to claim 4, wherein the length of said shoulder is substantially less than a diameter of said centering bushing.

6. The injection nozzle according to claim 2, wherein said tip insert includes a cylindrical fitting surface which protrudes into a bore of said nozzle body and is secured in said bore by way of a ring nut.

7. The injection nozzle according to claim 2, further comprising an axial dilatation joint between said nozzle body and said mold insert.

8. The injection nozzle according to claim 2, wherein said centering bushing and said tip insert are composed of different materials.

9. The injection nozzle according to claim 8, wherein said centering bushing is composed of hardened steel.

10. The injection nozzle according to claim 2, wherein said centering bushing and said tip insert are preformed as an integrated single piece of the same material.

11. The injection nozzle according to claim 2, wherein said needle comprises a cylindrical guiding portion adjacent to said cylindrical needle tip, said guiding portion being guided by a guideway in said centering bushing.

12. The injection nozzle according to claim 11, wherein said guideway is cylindrical and said cylindrical guiding portion of said needle is provided with grooves for the backflow of molding material.

13. The injection nozzle according to claim 2, wherein said needle comprises a cylindrical guiding portion adjacent to said cylindrical needle tip, said cylindrical guiding portion being guided by a cylindrical guideway adjacent said gate opening, and said cylindrical guiding portion of said needle being provided with grooves for the backflow of molding material.

* * * * *